United States Patent [19]
Pieterse et al.

[11] Patent Number: 5,574,929
[45] Date of Patent: Nov. 12, 1996

[54] PROCESSOR CIRCUIT COMPRISING A FIRST PROCESSOR, A MEMORY AND A PERIPHERAL CIRCUIT, AND SYSTEM COMPRISING THE PROCESSOR CIRCUIT AND A SECOND PROCESSOR

[75] Inventors: Rob Pieterse, Zandvoort; Wing K. Cheung, Voorburg; Dirk J. J. Van Bruchem, Wateringen, all of Netherlands

[73] Assignee: Koninklijke PTT Nederland N.V., Netherlands

[21] Appl. No.: 253,406

[22] Filed: Jun. 3, 1994

[30]     Foreign Application Priority Data

Jun. 23, 1993 [NL] Netherlands ............................ 9301093

[51] Int. Cl.$^6$ .................................................. G06F 13/00
[52] U.S. Cl. ........................ 395/800; 395/834; 364/238.2; 364/DIG. 1
[58] Field of Search ...................................... 395/800, 275, 395/250, 834; 364/238.2, DIG. 1

[56]         References Cited

U.S. PATENT DOCUMENTS

| | | | |
|---|---|---|---|
| 4,204,251 | 5/1980 | Brudevold ............................... | 395/309 |
| 4,327,408 | 4/1982 | Frissell et al. ........................ | 395/275 |
| 4,534,011 | 8/1985 | Andrews et al. ...................... | 395/250 |
| 4,620,118 | 10/1986 | Barber .................................... | 327/19 |
| 4,682,285 | 7/1987 | Ozil et al. .............................. | 395/275 |
| 4,720,784 | 1/1988 | Radhakrishnan et al. ............. | 395/287 |
| 5,101,490 | 3/1992 | Getson, Jr. et al. ................... | 395/835 |
| 5,283,872 | 2/1994 | Ohnishi ................................... | 395/325 |
| 5,363,484 | 11/1994 | Desnoyers et al. ................... | 395/200.07 |

FOREIGN PATENT DOCUMENTS 0106557    4/1984    European Pat. Off. .

OTHER PUBLICATIONS

Erwin Rieg, "SCSI–Schnittstelle: Verbessertes Konzept vermeidet Engpasse", *Elektronik*, 38(1989)29 Sep., No. 20, Munchen, Germany, pp. 52–56.
S. Naqvi, "Low–cost, dual–port RAM design delivers high performance", *Electronic Design News*, Jan. 24, 1985, pp. 155–158 and 160.

*Primary Examiner*—Alyssa H. Bowler
*Assistant Examiner*—John Harrity
*Attorney, Agent, or Firm*—Michaelson & Wallace; Peter L. Michaelson; John C. Pokotylo

[57]               ABSTRACT

Personal computers, a first processor and a second processor belonging to a processor circuit such as a PC card, communicate with one another via a quasi dual-port RAM. The first processor and the second processor alternately read data out of the RAM and write other data into the RAM. Furthermore, the second processor communicates directly with an associated peripheral device. By offering the possibility of, in a first mode, communication between the first processor and the RAM, and communication among the second processor, the peripheral device and the RAM and, in a second mode, communication between the first processor and the peripheral device without using the RAM and without the intervention of the second processor, the PC card becomes sufficient for test purposes and permits backup possibilities. By storing a synchronization protocol into the first processor and into the second processor, the first processor and the second processor can be easily synchronized with each other.

11 Claims, 5 Drawing Sheets

| FIG. 3A | FIG. 3B |

PROCESSOR CIRCUIT COMPRISING A FIRST PROCESSOR, A MEMORY AND A PERIPHERAL CIRCUIT, AND SYSTEM COMPRISING THE PROCESSOR CIRCUIT AND A SECOND PROCESSOR

BACKGROUND OF THE INVENTION

The present invention relates to a processor circuit comprising a first processor which can be coupled to a first input/output of a memory circuit. The processor circuit includes; a peripheral circuit which can be coupled to the first processor. A second input/output of the memory circuit may be coupled to a second processor.

Such a processor circuit is disclosed in U.S. Pat. No. 4,620,118. The processor circuit described therein comprises the memory circuit, which consists of a memory (random-access memory or RAM), a multiplexer (MUX) coupled thereto, a first switching port (LATCH-1) which is coupled to the MUX and is connected to the first processor, and a second switching port (LATCH-2) which is coupled to the MUX and is connected to the second processor. As a result of using the MUX and the two LATCHES, the RAM is transformed into a so-called quasi-dual port RAM (QDPR) or into a memory circuit having a first input/output and a second input/output. The two processors can communicate with one another via such a memory circuit, a conflict being avoided by using a so-called contention-resolving circuit (CRC) coupled to both processors and the MUX.

Such a known processor circuit is disadvantageous because it has little flexibility because it is insufficient for test purposes and has insufficient back-up facilities at its disposal.

SUMMARY OF THE INVENTION

The object of the present invention is, inter alia, to provide a processor circuit of the type stated in the introduction which is more flexible because it is sufficiently suitable for test purposes and has sufficient back-up facilities at its disposal.

For this purpose, the processor circuit according to the present invention has the characteristic that it is designed, in one situation, for communication between the second processor and the memory circuit, on the one hand, and communication between the first processor and the memory circuit and the peripheral circuit, on the other hand, and it is designed, in another situation, for communication between the second processor and the peripheral circuit. Because the processor is designed, in one situation (the so-called "intelligent mode"), for direct communication between the second processor and the memory circuit, on the one hand, and direct communication between the first processor and the memory circuit and the peripheral circuit, on the other hand, and the processor circuit is designed, in another situation (the so-called "dumb mode"), for direct communication between the second processor and the peripheral circuit belonging to the first processor, the second processor can communicate directly, for test purposes, with the peripheral circuit of the first processor (the dumb mode), while the direct communication between the first processor and the memory and the peripheral circuit is available (the intelligent mode) as back-up facility (if the second processor fails). The direct communication between the second processor and the peripheral circuit belonging to the first processor remains available as another back-up facility (if the first processor fails).

The present invention is based on the insight that a personal-computer card or PC card (the processor circuit) with a 68000 processor thereon (the first processor), the memory circuit and the peripheral circuit must function both separately from an application program in a PC (personal computer) having its own processor (the second processor) (the intelligent mode) under the direct control of the PC having its own PC processor (the dumb mode).

In a first embodiment of the processor circuit according to the present invention, the memory circuit is provided with a memory and with switching means for coupling, in one situation, the second input/output to the memory, on the one hand, and coupling the first input/output to the memory, on the other hand, and, in the other situation, coupling the second input/output to the first input/output.

Since the memory circuit is provided with the memory and with the switching means for coupling, in one situation (the intelligent mode), the second input/output to the memory, on the one hand, and coupling the first input/output to the memory, on the other hand, and, in the other situation (the dumb mode), coupling the second input/output to the first input/output, the second processor can communicate with the memory in the intelligent mode and the first processor can communicate with the memory and the peripheral circuit, while, in the dumb mode, the second processor can communicate directly with the peripheral circuit belonging to the first processor. Here the switching means must be broadly interpreted not only true hardware switches or port circuits should be considered, but it is also certainly conceivable that all the components mentioned are continuously, that is to say without interruptions, interconnected and that the switching is achieved by triggering "enable" and/or "select" and/or "direction" control inputs in a particular way.

In a second embodiment of the processor circuit according to the present invention, the switching by the switching means takes place in response to a control signal originating from the first processor. If the switching by the switching means or the triggering of the "enable" and/or "select" and/or "direction" control inputs takes place in response to a control signal originating from the first processor, the processor circuit determines whether communication is in the intelligent mode or in the dumb mode. Of course, this could take place on an instruction from the second processor. The actual control signal always originates, however, from the processor circuit, which is advantageous for various test purposes and back-up facilities.

In a third embodiment of the processor circuit according to the present invention has the characteristic that the first processor comprises a reset input for resetting the first processor in response to a signal originating from the second processor or the peripheral circuit.

If the first processor comprises the reset input for resetting the first processor in response to the signal originating from the second processor or the signal originating from the peripheral circuit (on instruction from the second processor in the dumb mode), the second processor is able to "reset" the first processor in the dumb mode, which should result in the control signal originating from the first processor, as a result of which the intelligent mode is selected. As a consequence of this, the first processor again acquires access to the peripheral circuit.

The present invention furthermore relates to a system comprising the processor circuit according to the present invention. The system according to the present invention has the characteristic that the system comprises the second processor coupled to the processor circuit.

The object of the present invention is, inter alia, to provide a system of the abovementioned type in which the first processor and the second processor are can to mutually synchronize themselves.

For this purpose, in the system according to the present invention, the second processor is designed, in response to a start signal, to read a first field of the memory after a first time interval; and if an error signal is stored in the first field of the memory, to generate an error message, and, if this is not the case, to generate a ready signal within a second time interval and place said ready signal in a second field of the memory; and the first processor is designed, in response to the start signal:

to test itself; and if an error is detected during the testing, to generate the error signal and place said error signal in the first field within the first time interval, and, if this is not the case, to read the second field of the memory after the second time interval, the second time interval being greater than the first time interval.

By enabling the first processor to test itself in response to the start signal, which may or may not yield an error signal, and by enabling the second processor to generate an error message in response to the error signal (and/or a subsequent start signal, in response to which the first processor will retest itself) and, in response to the lack of the error signal, to enable it to generate a ready signal, both processors will be in a synchronous state some time after the ready signal.

In an embodiment of the system according to the present invention, the second processor is designed:

to read a third field of the memory after a third time interval;

if a first confirmation signal is stored in the third field, to initialize the memory circuit and place an initialization signal in a fourth field of the memory within a fourth time interval, and, if this is not the case, to generate an error message;

to read a fifth field of the memory after a fifth time interval;

if a second confirmation signal is placed in the fifth field, to generate an o.k. message, and, if this is not the case, to generate an error message, and the first processor is designed:

to generate the first confirmation signal within the third time interval in response to the ready signal placed in the second field of the memory and to place said first confirmation signal in the third field of the memory;

to read the fourth field of the memory after a fourth time interval;

if the initialization signal is stored in the fourth field, to generate a second confirmation signal and place said second confirmation signal in the fifth field of the memory within the fifth time interval, the fifth time interval being longer than the fourth time interval, which is longer than the third time interval, which is longer than the second time interval.

As a result of enabling the first processor to generate the first confirmation signal in response to the ready signal, after which the second processor initializes the memory circuit and generates the initialization signal, in response to which the first processor generates a second confirmation signal, after which the second processor generates the o.k. message, both processors are ready to start communicating. In this intelligent mode, both processors can to start communications, and conflicts have to be resolved by assigning certain priorities (such as is described, for example, in the abovementioned U.S. Pat. No. 4,620,118). Within the scope of simplifying the system according to the present invention and saving memory space in said system, it is advantageous to arrange for at least some of the first to fifth fields, inclusive, of the memory to coincide.

All the time intervals, which increase in length, are calculated from the instant of the start signal. If the time intervals are implemented by hardware or software counters which do not start to count from the start signal but which start, for example, in response to a detected signal, the new time intervals implemented by said counters will not necessarily be of increasing length, and a protocol obtained in this manner will proceed more efficiently. As regards the efficiency of the protocol, a further advantage could be obtained by arranging for the two processors not to read a certain field of the memory after a certain time interval but by arranging for them to scan the particular field regularly during said certain time interval, in which case a certain signal should be read within the certain time interval and, after the certain time interval, an error message should be generated if the certain signal is not found. The system according to the present invention and the embodiment of said system relate both to a system having regularly scanning processors and to a system which starts, in response to detected signals, new time intervals, which are not necessarily of increasing length. However, when recalculated from the instant of the start signal, these recalculated new time intervals are again of increasing length.

Please incorporate U.S. Pat. No. 4,620,118 and Dutch application No. 9301093 (priority document) in this application by reference.

BRIEF DESCRIPTION OF THE DRAWINGS

The present invention will be explained in greater detail with reference to an exemplary embodiment shown in the figures.

DETAILED DESCRIPTION

Figure 1:
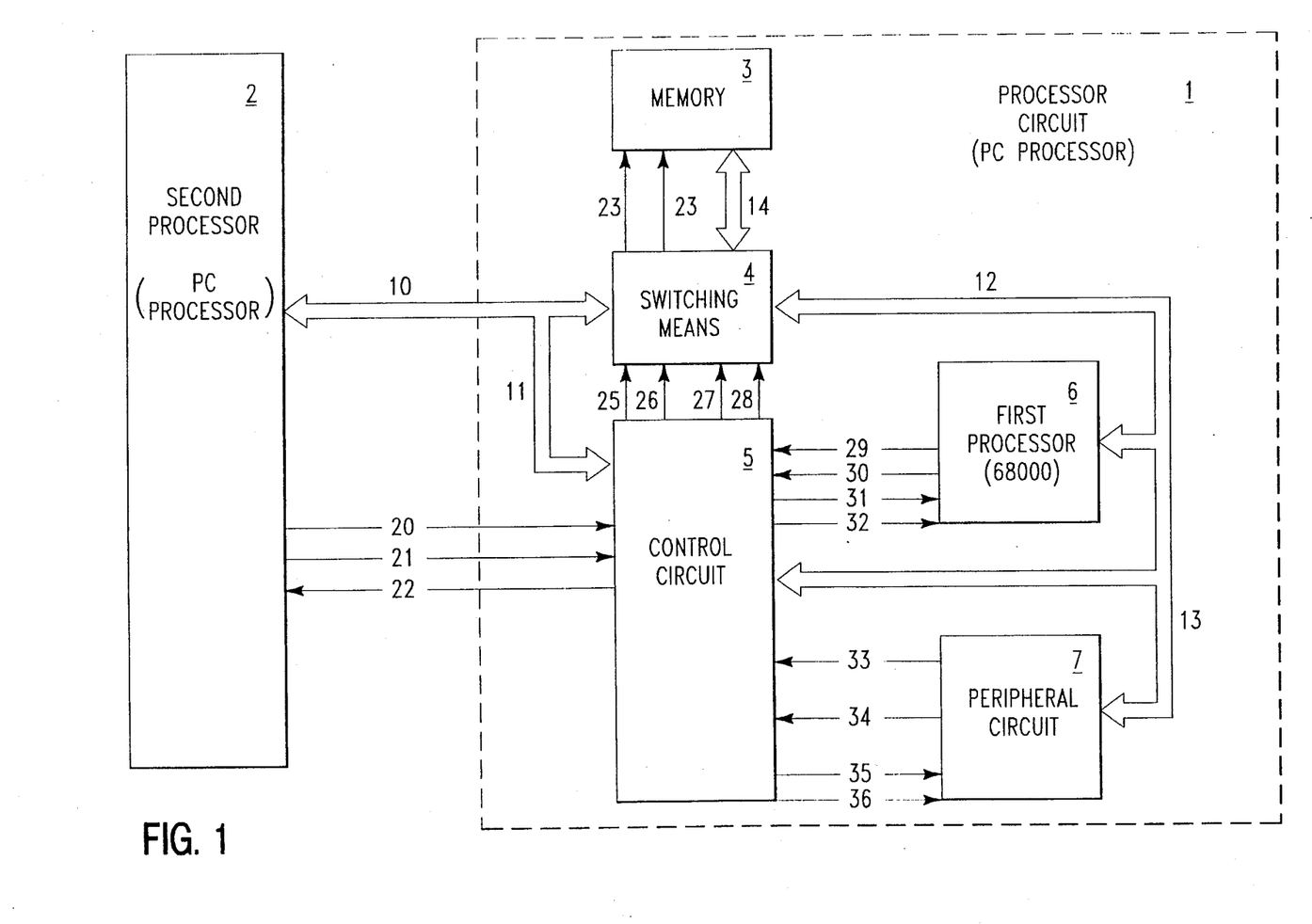
FIG. 1 is a block schematic of a system according to the present invention.

The system (personal computer or PC) shown in FIG. 1 comprises a processor circuit 1 (PC card) and a second processor 2 (PC processor). The processor circuit 1 consists of a memory 3 (random-access memory or RAM) and switching means 4, which together form a memory circuit (quasi-dual port RAM or QDPR). The processor circuit 1 furthermore consists of a control circuit 5, a first processor 6 (68000 processor) and a peripheral circuit 7.

RAM 3 and switching means 4 are mutually coupled via a bus 14 over which both data and address data can be transmitted (the address and data buses, which are actually separate, are shown as one bus for simplicity, and this applies to all the buses shown in the figures). Furthermore, the RAM 3 receives "chip-select" and "read/write" signals from switching means 4 via connections 23 and 24, respectively.

Switching means 4 are coupled via a bus 10 to the PC processor 2, which bus 10 merges into a bus 11, which is coupled to the control circuit 5. Furthermore, switching means 4 receive various signals from control circuit 5 via the connections 25, 26, 27 and 2g, which signals will come up for consideration in the more detailed description of the switching means in FIG. 2. Switching means 4 are furthermore coupled via a bus 12 to the 68000 processor 6, which bus merges into a bus 13, which is coupled to the peripheral circuit 7 and to the control circuit 5.

Control circuit 5 receives "request" and "read/write" signals from the PC processor 2 via connections 20 and 21, respectively, and sends back an "acknowledge" signal to the PC processor 2 via connection 22. Control circuit 5 receives "request" and "read/write" signals from the 68000 processor 6 via connections 29 and 30, respectively, and sends "acknowledge" and "reset" signals back to the 68000 processor 6 via the connections 31 and 32, respectively. As regards the acknowledge signal to be transmitted via connection 31, a distinction should be made in this connection between a "RAM 3 acknowledge" and a "peripheral circuit 7 acknowledge" signal. Furthermore, control circuit 5 receives "reset" and "dumb-mode" signals from the peripheral circuit 7 via connections 33 and 34, respectively, and the control circuit 5 sends a "chip-select" and a "read/write" signal to the peripheral circuit 7 via connections 35 and 36, respectively.

The 68000 processor 6 is, for example, of the type MC68000 supplied by MOTOROLA. Such a processor has its own RAM and its own EPROM, which are not shown in FIG. 1. The peripheral circuit 7 comprises, for example, an HSCX communication chip for point-to-multipoint communication of the type SAB 82525 N supplied by SIEMENS, with which 32 network entities can transmit information to the PC card, which then sets said information to a higher level, and it furthermore comprises, for example, a multifunctional peripheral (MFP) chip of the type 68 HC 901. The control circuit 5 can be constructed with programmable array logic chips (PAL) such as those of the type PAL C22V10 supplied by MMI. The RAM 3 is, for example, a static RAM of the type HM 62256.

The operation of the system shown in FIG. 1 is as follows. In one situation (the intelligent mode), PC processor 2 communicates with 68000 processor 6 via switching means 4 and RAM 3. 68000 processor 6 communicates directly with peripheral circuit 7 without the intervention of switching means 4 and RAM 3. This all takes place under the control of control circuit 5.

If PC processor 2 wishes to communicate with 68000 processor 6, for example because PC processor 2 has data which is intended for 68000 processor 6, PC processor 2 generates a "request" and a "write" signal which reach control circuit 5 via connections 20 and 21. In response to these signals, control circuit 5 generates an "acknowledge" signal, which reaches PC processor 2 via connection 22, and control circuit 5 generates a number of signals which reach switching means 4 via one or more of the connections 25 to 28 inclusive. In response to these signals, switching means 4 switch their second input/output, which is connected to bus 10 as input, after which said input is coupled to RAM 3 via bus 14. Address and data information then flow from PC processor 2 to RAM 3 via bus 10, switching means 4 and bus 14. 68000 processor 6 regularly generates a "request" and a "read" signal, which reach control circuit 5 via connections 29 and 30. In response to these signals, control circuit 5 generates a "(RAM 3) acknowledge" signal, which reaches 68000 processor 6 via connection 31, and control circuit 5 generates a number of signals which reach switching means 4 via one or more of the connections 25 to 28 inclusive. In response to said signals, switching means 4 switch their first input/output, which is connected to bus 12 as output, after which said output is coupled through to RAM 3 via bus 14. One or more addresses and data then flow from RAM 3 to 68000 processor 6, which in this case has the data originating from PC processor 2, via bus 14, switching means 4 and bus 12. Communication thus takes place between PC processor 2 and 68000 processor 6.

If 68000 processor 6 wishes to communicate with peripheral circuit 7, for example, because 68000 processor 6 has data which is intended for peripheral circuit 7, 68000 processor 6 generates a signal which reaches control circuit 5 via bus 13, which signal indicates that communication with the peripheral circuit is desired, in contrast to communication with RAM 3, and 68000 processor 6 generates a "request" signal and a "write" signal which reach control circuit 5 via connections 29 and 30. In response to these signals, 10 control circuit 5 generates a "chip-select" signal and a "write" signal which reach peripheral circuit 7 via connections 35 and 36, after which a "peripheral circuit 6 acknowledge" signal is generated, which reaches 68000 processor 6 via connection 31. Address and data information then flows from 68000 processor 6 to peripheral circuit 7, which in this case has the data originating from 68000 processor 6, via bus 13. Communication thus takes place between 68000 processor 6 and peripheral circuit 7.

In this first situation (the intelligent mode), the other situation (the dumb mode) can be selected in a simple manner by arranging for PC processor 2 to generate a dumb instruction, which reaches 68000 processor 6 as address with data in the manner described above. In response to this, 68000 processor 6 generates a dumb instruction, which reaches peripheral circuit 7 as address with data in the manner described above. In response to this, peripheral circuit 7 generates a "dumb-mode" signal via connection 34, after which 68000 processor 6 switches itself off and disconnects itself from bus 12 (by means of a so-called HALT procedure), in response to which control circuit 5 triggers switching means 4 via one or more of the connection 25 to 28 inclusive in such a way that the first input/output, which is connected to bus 12, and the second input/output, which is connected to bus 10, are mutually coupled through. After this, PC processor 2 and peripheral circuit 7 can communicate directly with one another via switching means 4 without making use of RAM 3.

In this other situation (the dumb mode), the first situation (the intelligent mode) can be selected in a simple manner by either arranging for PC processor 2 to generate a reset instruction which reaches peripheral circuit 7 as address with data in the manner described above, which peripheral circuit 7 generates a "reset" signal in response thereto via connection 33, in response to which control circuit 5 sends a "reset" signal to 68000 processor 6 via connection 32, which "reset" signal resets the 68000 processor; the latter starts again as a result of this, setting processor circuit 1 to the intelligent mode, which will come up for consideration later in a more extensive manner, or by arranging for the PC processor to generate another reset instruction, which reaches, via bus 1 1, control circuit 5, which in response thereto sends the "reset" signal to 68000 processor 6 via connection 32, which "reset" signal resets the 68000 processor; the latter starts again as a result, thereby setting processor circuit 1 to the intelligent mode, or by feeding a signal manually via a switch which is not shown in FIG. 1 to control circuit 5, which in response thereto sends the "reset" signal to 68000 processor 6 via connection 32, which "reset" signal resets the 68000 processor; the latter starts again as a result, thereby setting processor circuit 1 to the intelligent mode.

A reset can also be generated by switching off and then switching on the supply voltage, in which case the processor circuit 1 starts up in the intelligent mode.

Of course, control circuit 5 should be provided with an arbiter function, such as is disclosed, for example, in the abovementioned reference, U.S. Pat. No. 4,620,118, in order to avoid a conflict of signals.

Figure 2:
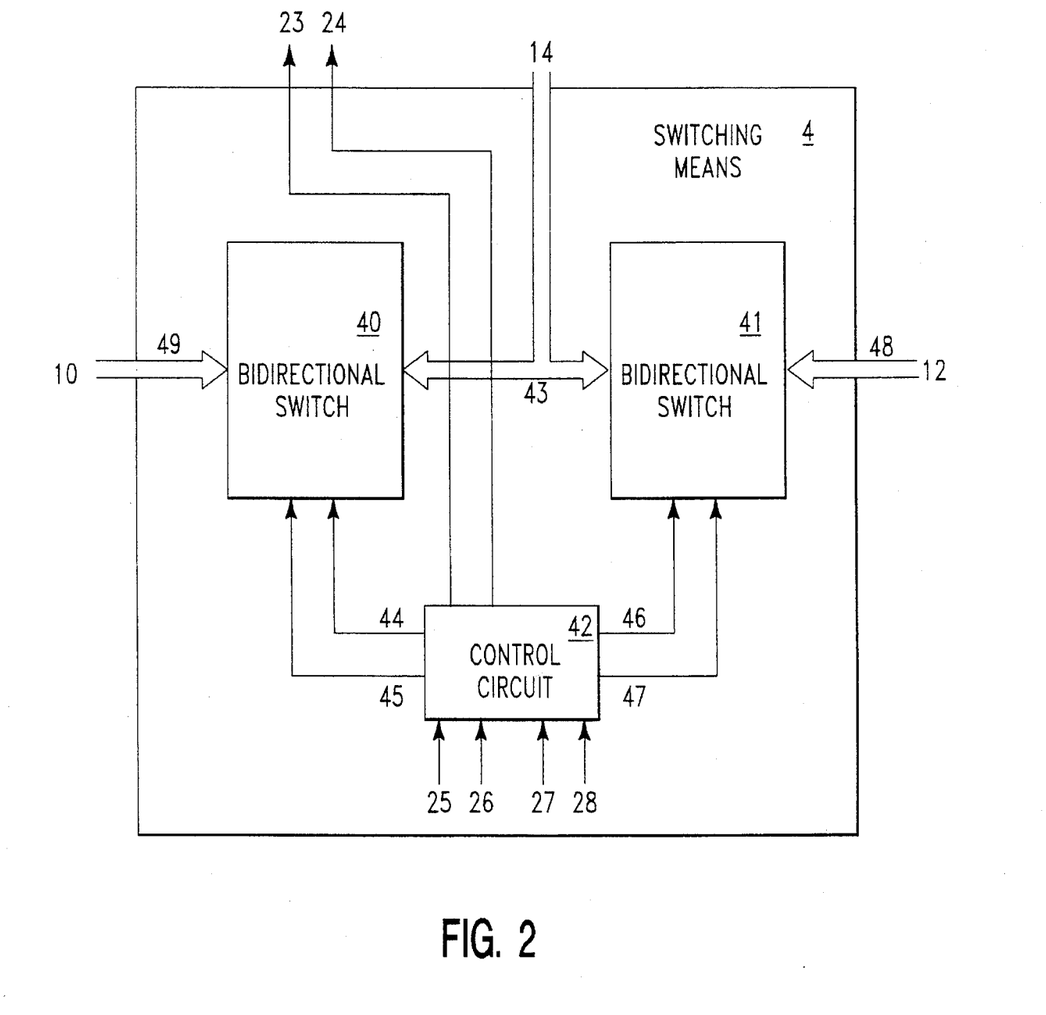
FIG. 2 is a block schematic of a switching means for use in the system according to the present invention.

A first input/output 48 of the switching means 4, which is elaborated in greater detail in FIG. 2, is coupled to bus 12 and a second input/output 49 is coupled to bus 10. First input/output 48 is connected to a first input/output of bidirectional switch 41 and second input/output 49 is connected to a first input/output of bidirectional switch 40. Second inputs/outputs of the two bidirectional switches 40 and 41 are mutually coupled via a bus 43 and connected to bus 14. The transmission direction of bidirectional switch 40 is set in response to a "direction" signal via connection 44 and the transmission direction of bidirectional switch 41 is set in response to a "direction" signal via connection 46. Bidirectional switch 40 is switched on or off in response to an "enable/disable" signal via connection 45, and bidirectional switch 41 is switched on or off in response to an "enable/disable" signal via connection 47. The four signals mentioned originate from control unit 42, which furthermore generates signals designed for RAM 3 via the connections 23 and 24. Control unit 42 generates one or more of the above signals in response to signals originating from control circuit 5, the latter signals being fed to control unit 42 via the connections 25 to 28 inclusive.

The bidirectional switches 40 and 41 are each, for example, an octal bus transceiver (tristate) of the type SN 74 HCT 645 supplied by Texas Instruments. The control unit 42 may be constructed using programmable array logic chips (PAL) such as those of the type PAL C22V10 supplied by MMI.

If PC processor 2 wishes to send address and/or data information to RAM 3 (in the intelligent mode), control circuit 5 generates, as already described above, a number of signals which reach switching means 4 and control unit 42 via the connections 25 to 28 inclusive. In response to these signals, control unit 42 generates an "enable" signal (for example, a logic one) via connection 45, in response to which bidirectional switch 40 switches itself on, a "direction" signal (for example, a logic one) via connection 44, in response to which bidirectional switch 40 switches its first input/output 49 as input and its second input/output as output, a "disable" signal, (for example, a logic zero) via connection 47, in response to which bidirectional switch 41 switches itself off, a "chip-select" signal (for example, a logic one) via connection 23, in response to which RAM 3 is activated, and a "write" signal (for example, a logic one) via connection 24, in response to which RAM 3 receives one or more addresses and/or data supplied via bus 10, bidirectional switch 40, bus 43 and bus 14.

If PC processor 2 wishes to send one or more addresses and/or data to peripheral circuit 7 (in the dumb mode), control unit 5 generates, as already described above, a number of signals which reach switching means 4 and control unit 42 via the connections 25 to 28 inclusive. In response to these signals, control unit 42 generates an "enable" signal (for example, a logic one) via connection 45, in response to which bidirectional switch 40 switches itself on, a "direction" signal (for example, a logic one) via connection 44, in response to which bidirectional switch 40 switches its first input/output 49 as input and its second input/output as output, an "enable" signal, (for example, a logic one) via connection 47, in response to which bidirectional switch 41 switches itself on, a "direction" signal (for example, a logic zero) via connection 46, in response to which bidirectional switch 41 switches its first input/output 48 as output and its second input/output as input, a "chip-select" signal (for example, a logic zero) via connection 23, in response to which RAM 3 is deactivated, after which peripheral circuit 7 receives one or more addresses and/or data supplied via bus 10, bidirectional switch 40, bus 43, bidirectional switch 41 and bus 12.

A possible choice of input signals to be fed via connections 25, 26, 27, 28 to control unit 42 and output signals to be generated by control unit 42 via connections 23, 24, 44, 45, 46, 47 is shown in Table 1. As already pointed out above, control unit 42 can be constructed using a programmable logic array. It is pointed out that this and subsequent tables show the relevant states only diagrammatically. In reality, the operation of control unit 42 (and control unit 15) is sequential and derived from state coding.

TABLE 1

| 25 | 26 | 27 | 28 | 23 | 24 | 44 | 45 | 46 | 47 |
|----|----|----|----|----|----|----|----|----|----|
| 0  | 0  | 0  | 0  | —  | —  | —  | 0  | —  | 0  |
| 0  | 0  | 0  | 1  | 1  | 1  | 1  | 1  | —  | 0  |
| 0  | 0  | 1  | 0  | 1  | 0  | 0  | 1  | —  | 0  |
| 0  | 0  | 1  | 1  | 1  | 1  | —  | 0  | 1  | 1  |
| 0  | 1  | 0  | 0  | 1  | 0  | —  | 0  | 0  | 1  |
| 1  | 0  | 0  | 0  | 0  | —  | 1  | 1  | 0  | 1  |
| 1  | 0  | 0  | 1  | 0  | —  | 0  | 1  | 1  | 1  |

In response to input word 0000 to be fed via connections 25, 26, 27, 28, the output word XXX0X0 to be fed via the connections 23, 24, 44, 45, 46, 47 is generated, which implies that bidirectional switches 40 and 41 are each been fed a "disable" signal, in which case the remaining output signals can of course assume any possible value (X = don't care). In response to the input word 0001, data is fed by bus 10, bidirectional switch 40, bus 43 and bus 14 to the RAM 3, whereas, in response to the input word 0010, data flows in the opposite direction. In response to the input word 0011, data is fed by bus 12, bidirectional switch 41, bus 43 and bus 14 to the RAM 3, whereas, in response to the input word 0100, data flows in the opposite direction. In response to the input word 1000, data flows from bus 10, via bidirectional switch 40, bus 43 and bidirectional switch 41 to bus 12, RAM 3 being fed a deactivating "chip-select" signal, whereas, in response to the input word 1001, data flows in the opposite direction. In the case of all the remaining input words, the output words are to be chosen arbitrarily (don't care) or in such a way that other triggerings are possible, possibly even with output signals which are transmitted via connections not shown in the figure.

There now follows a possible implementation of control circuit 5, which, as already pointed out above, can be constructed using a so-called programmable logic array, on the basis of Tables 2a (input signals) and 2b (output signals)

TABLE 2a

| 11 | 13 | 20 | 21 | 29 | 30 | 33 | 34 | |
|----|----|----|----|----|----|----|----|---|
| 00 | — | 1 | 1 | — | — | — | — | A |
| 00 | — | 1 | 0 | — | — | — | — | B |
| 00 | 0 | 0 | — | 1 | 1 | — | — | C |
| 00 | 0 | 0 | — | 1 | 0 | — | — | D |
| 00 | 1 | 0 | — | 1 | 1 | — | — | E |
| 00 | 1 | 0 | — | 1 | 0 | — | — | F |
| 01 | — | 1 | 1 | — | — | — | — | G |
| 01 | — | 1 | 0 | — | — | — | — | H |
| 00 | — | 1 | 1 | — | — | — | 1 | I |
| 00 | — | 1 | 0 | — | — | — | 1 | J |
| 10 | — | 0 | — | 0 | — | — | 0 | K |
| 00 | — | 0 | — | 0 | — | 1 | 0 | L |

TABLE 2b

|   | 22 | 25 | 26 | 27 | 28 | 31 | 32 | 35 | 36 |
|---|----|----|----|----|----|----|----|----|----|
| A | 1 | 0 | 0 | 0 | 1 | 0 | 0 | 0 | 0 |
| B | 1 | 0 | 0 | 1 | 0 | 0 | 0 | 0 | 0 |
| C | 0 | 0 | 0 | 1 | 1 | 1 | 0 | 0 | 0 |
| D | 0 | 0 | 1 | 0 | 0 | 1 | 0 | 0 | 0 |
| E | 0 | 0 | 0 | 0 | 0 | 1 | 0 | 1 | 1 |
| F | 0 | 0 | 0 | 0 | 0 | 1 | 0 | 1 | 0 |
| G | 0 | 1 | 0 | 0 | 0 | 0 | 0 | 1 | 1 |
| H | 0 | 1 | 0 | 0 | 1 | 0 | 0 | 1 | 0 |
| I | 0 | 1 | 0 | 0 | 0 | 0 | 0 | 1 | 1 |
| J | 0 | 1 | 0 | 0 | 1 | 0 | 0 | 1 | 0 |
| K | 0 | 0 | 0 | 0 | 0 | 0 | 1 | 0 | 0 |
| L | 0 | 0 | 0 | 0 | 0 | 0 | 1 | 0 | 0 |

Figures 3, 3A:
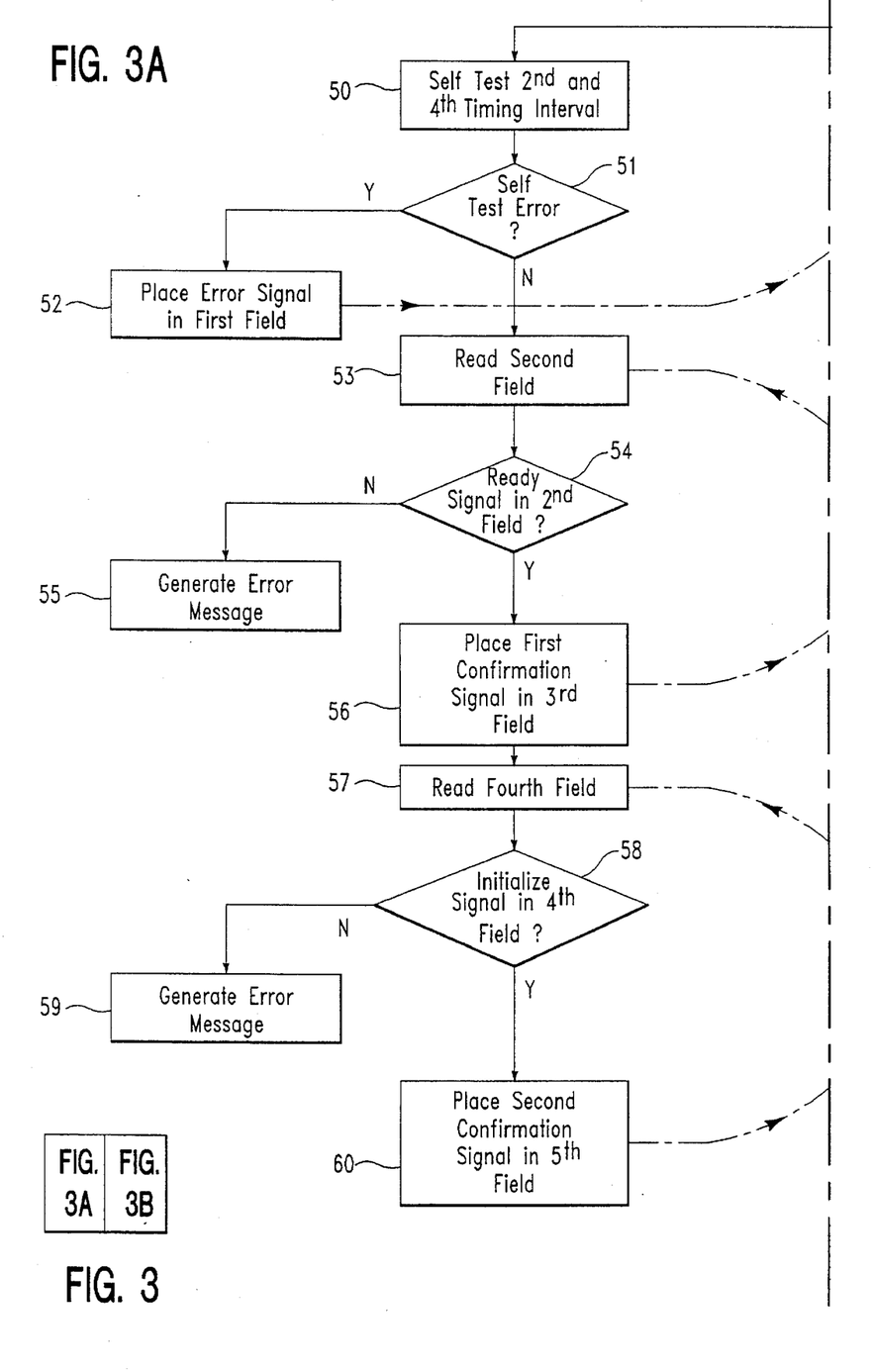
FIG. 3 shows a flow chart of a synchronization protocol for use in the system according to the present invention.
Figure 3B:
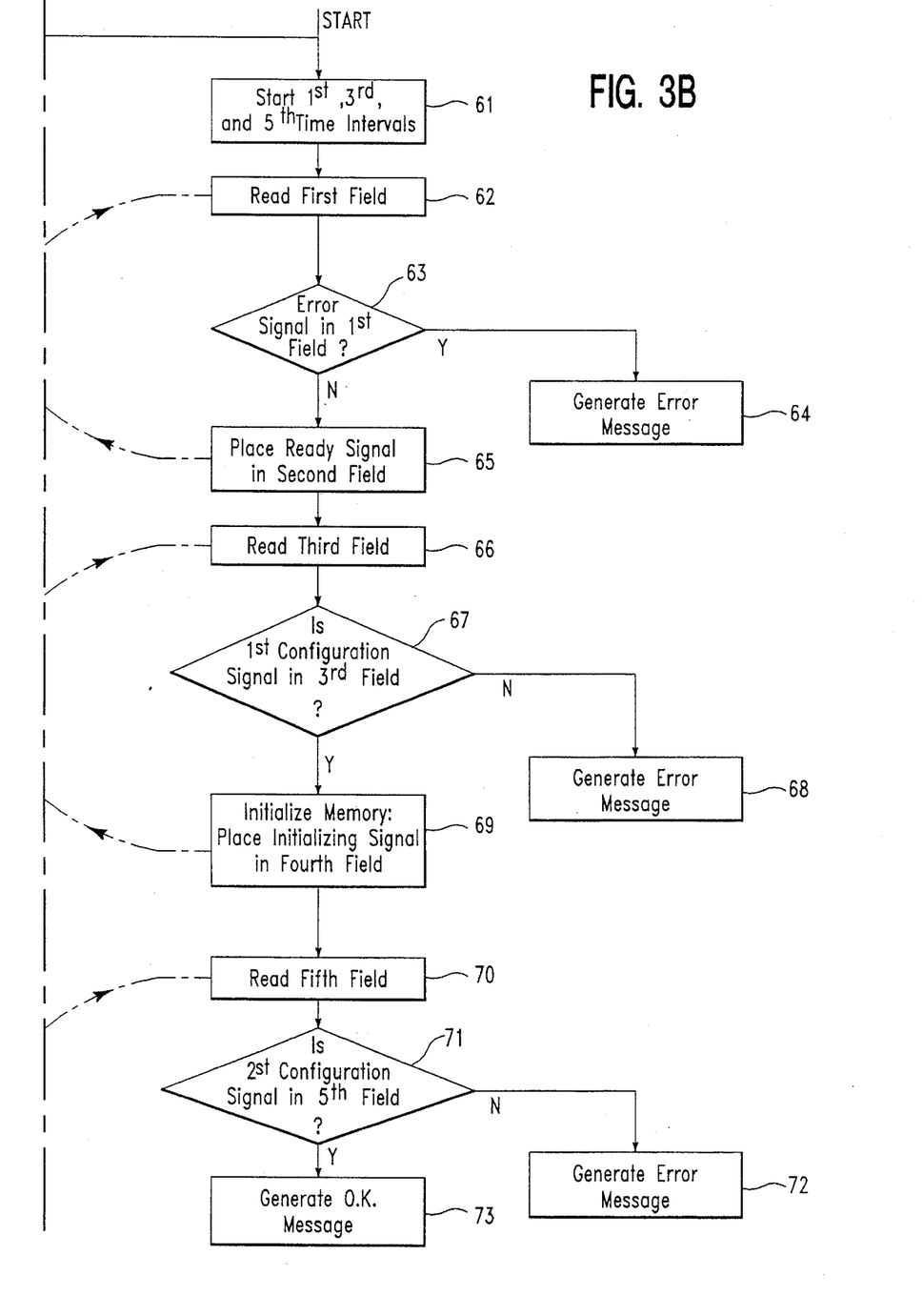

In Tables 2a and 2b, situation A corresponds to the requesting of permission and acquisition of confirmation by PC processor 2 in the intelligent mode to place data in RAM 3. Situation B corresponds to the requesting of permission and acquisition of confirmation by PC processor 2 in the intelligent mode to retrieve data from RAM 3. Situation C corresponds to the requesting of permission and acquisition of confirmation by 68000 processor 6 in the intelligent mode to place data in RAM 3. Situation D corresponds to the requesting of permission and acquisition of confirmation by 68000 processor 6 in the intelligent mode to retrieve data from RAM 3. Situation E corresponds to the requesting of permission and acquisition of confirmation by 68000 processor 6 in the intelligent mode to place data in peripheral circuit 7. Situation F corresponds to the requesting of permission and acquisition of confirmation by 68000 processor 6 in the intelligent mode to retrieve data from peripheral circuit 7. Situations G (dumb mode directly selected by PC processor 2) and I (dumb mode selected by peripheral circuit 7 under the control of 68000 processor 6 on instruction from the PC) correspond to the requesting of permission and acquisition of confirmation by PC processor 2 in the dumb mode to place data in peripheral circuit 7. Situation H (dumb mode directly selected by PC processor 2) and J (dumb mode selected by peripheral circuit 7 under the control of 68000 processor 6 on instruction from the PC) correspond to the requesting of permission and acquisition of confirmation by PC processor 2 in the dumb mode to retrieve data from peripheral circuit 7. Situations K (reset direct from PC processor 2) and L (reset from peripheral circuit 7 on instruction from the PC) correspond to the resetting of the 68000 processor 6 in the dumb mode. In the flow chart shown in FIG. 3, the following blocks have the following meaning:

| block | meaning |
|-------|---------|
| 50 | start of self-testing, start of the second and fourth time interval |
| 51 | error detected in self-testing?<br>if yes: proceed to block 52<br>if no: proceed to block 53 |
| 52 | generate error signal and place said error signal in first field |
| 53 | read contents of second field after second time interval |
| 54 | is ready signal present in second field?<br>if yes: proceed to block 56<br>if no: proceed to block 55 |
| 55 | generate error message |
| 56 | generate first confirmation signal and place said confirmation signal in third field |
| 57 | read contents of fourth field after fourth time interval |
| 58 | is initialization signal present in fourth field?<br>if yes: proceed to block 60<br>if no: proceed to block 59 |
| 59 | generate error message |
| 60 | generate second confirmation signal and place said confirmation signal in fifth field |
| 61 | start of the first, third and fifth time interval |
| 62 | read contents of first field after first time interval |
| 63 | is error signal present in first field?<br>if yes: proceed to block 64<br>if no: proceed to block 65 |
| 64 | generate error message |
| 65 | generate ready signal and place said ready signal in second field |
| 66 | read contents of third field after third time interval |
| 67 | is first confirmation signal present in third field?<br>if yes: proceed to block 69<br>if no: proceed to block 68 |
| 68 | generate error message |
| 69 | initialize memory circuit and place initialization signal in fourth field |
| 70 | read contents of fifth field after fifth time interval |
| 71 | is second confirmation signal present in second field?<br>if yes: proceed to block 73<br>if no: proceed to block 72 |
| 72 | generate error message |
| 73 | generate o.k. message |

Figure 4:
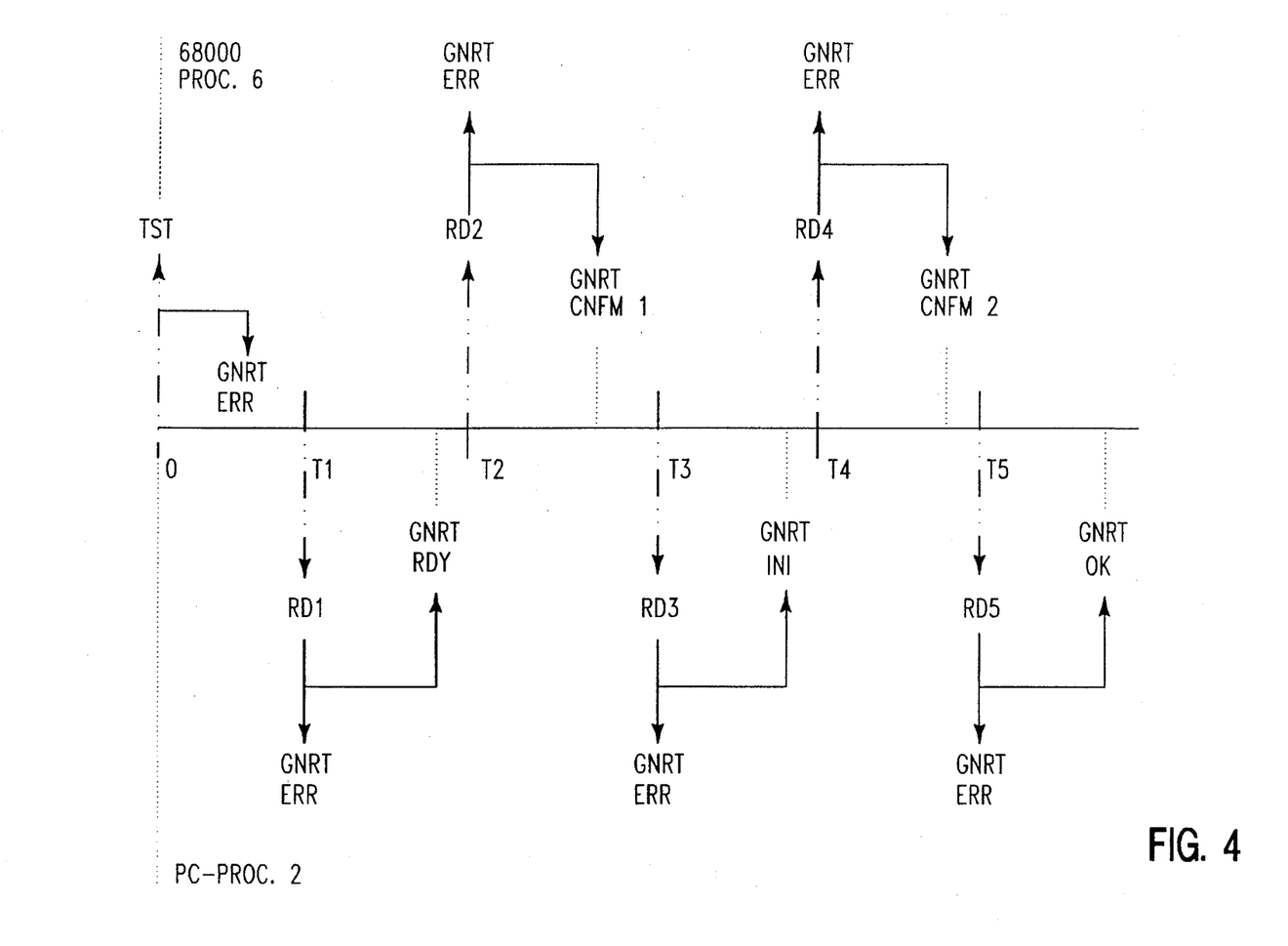
FIG. 4 shows a timing diagram associated with the flow chart of FIG. 3.

The operation of the synchronization protocol whose flow chart is shown in FIG. 3 and whose timing diagram is shown in FIG. 4 is as follows. In response to a start signal (STRT), the 68000 processor 6 starts a generally known self-testing (TST) and a second time interval (T2) and a fourth time interval (T4) start (block 50). A first time interval (T1), a third time interval (T3) and a fifth time interval (T5) start at the same time (block 61).

If 68000 processor 6 detects an error during the self-testing (block 51), it places an error signal in a first field (GNRT ERR) of RAM 3 (block 52). After the expiration of the first time interval (T1), PC processor 2 reads the contents of the first field (RD1) of RAM 3 (block 62), and if the error signal is present in said first field (block 63), PC processor 2 generates an error message (GNRT ERR) (block 64), while if it is not present, PC processor 2 places a ready signal in a second field (GNRT RDY) of RAM 3 (block 65).

If no error is detected by 68000 processor 6 (block 51), it reads, after the expiration of the second time interval (T2), the contents of a second field (RD2) of RAM 3 (block 53). If the ready signal is not present in the second field (block 54), 68000 processor 6 generates an error message (GNRT ERR) (block 55) and if it is in fact present, 68000 processor 6 places a first confirmation signal (GNRT CNFM1) in a third field of RAM 3 (block 56).

After the third time interval (T3) PC processor 2 reads the contents of the third field (RD3) of RAM 3 (block 66). If the first confirmation signal is not present in the third field (block 67), PC processor 2 generates an error message (GNRT ERR) (block 68) and if it is in fact present, PC processor 2 initializes the memory circuit (a section of RAM 3 and switching means 4) and places an initialization signal (GNRT INI) in a fourth field of RAM 3 (block 69).

After the expiration of the fourth time interval (T4), 68000 processor reads the contents of the fourth field (RD4) of RAM 3 (block 57). If the initialization signal is not present in the fourth field (block 58), 68000 processor 6 generates an error message (GNRT ERR) (block 59) and if it is in fact present, it places a second confirmation signal (GNRT CNFM2) in a fifth field of RAM 3 (block 60).

After the fifth time interval (T5) PC processor 2 reads the contents of the fifth field (RD5) of RAM 3 (block 70). If the second confirmation signal is not present in the fifth field (block 71), PC processor 2 generates an error message (GNRT ERR) (block 72) and if it is in fact present, PC processor 2 generates an o.k. message (GNRT OK) (block 73). Such an o.k. message may literally comprise a message on a screen and, more figuratively, it may consist of a signal in response to which programs start to be carried out.

For a good operation of the synchronization protocol, it is, of course, necessary for a time interval having a higher number to be greater than a time interval having a lower number, each time interval must be chosen such that the operations to be carried out by the processors within said time interval can actually occur Thus, the chosen length of the first time interval must be sufficient to enable the self-testing which is to be carried out by 68000 processor 6, to deliver any error signal within said first time interval in an ample manner. Of course, this applies only if all the time intervals are calculated from the start signal. If the time intervals are implemented by hardware or software counters which do not start to count from the start signal but which start, for example, in response to a detected signal, the new time intervals implemented by said counters will not necessarily be of increasing length, and the synchronization protocol obtained in this way will be more efficient.

It is pointed out that, as regards the efficiency of the protocol, further advantage should be obtained by arranging for both processors to read a certain field of the memory not after a certain time interval but by arranging for them to scan the certain field regularly during said certain time interval. In this case, a certain signal would have to be read within the certain time interval and, after the certain time interval, if the certain signal is not found, an error message is generated.

The exclusive rights formulated hereafter comprise both a system having regularly scanning processors and a system which starts new time intervals, which are not necessarily of increasing length, in response to detected signals. However, recalculated from the instant of the start signal, the recalculated new time intervals are in fact of increasing length.

We claim:

1. A processor circuit comprising:

a first processor;

a memory circuit including a memory, a first input/output for coupling the first processor with the memory circuit, and a second, input/output for coupling a second processor with the memory circuit; and a peripheral circuit for coupling to the first processor, wherein the processor circuit has a first operational mode, for communication between the second processor and the memory of the memory circuit and communication among the first processor and the peripheral circuit and the memory of the memory circuit, and has a second operational mode, for communication between the second processor and the peripheral circuit without using the memory of the memory circuit, and wherein the memory circuit is provided with switching means for coupling, in the first operational mode, the second input/output to the memory and coupling the first input/output to the memory and, in the second operational mode, coupling the second input/output to the first input/output.

2. The processor circuit according to claim 1, wherein the switching by the switching means occurs in response to a control signal originating from the first processor.

3. The processor circuit according to claim 2, wherein the first processor has a reset input for restarting the first processor in response to a signal originating from one of the second processor and the peripheral circuit.

4. A system including:

a processor circuit comprising a first processor, a memory circuit including a memory, and a peripheral circuit coupled to the first processor; and second processor, wherein the memory circuit has a first input/output port for coupling the first processor with the memory circuit, and a second input/output port for coupling the second processor with the memory circuit, and wherein the processor circuit has a first operational mode, for communication between the second processor and the memory of the memory circuit and communication among the first processor and the peripheral circuit and the memory of the memory circuit, and has a second operational mode, for communication between the second processor and the peripheral circuit without using the memory of the memory circuit, and wherein the memory circuit is provided with means for coupling in the first operational mode, the second input/output to the memory and coupling the first input/output to the memory and, in the second operational mode, coupling the second input/output to the first input/output.

5. The system according to claim 4, wherein the second processor, in response to a start signal:

reads a first field of the memory after a first time interval; and if an error signal is stored in the first field of the memory, generates an error message, and, if the error signal is not stored in the first field of the memory, generates a ready signal within a second time interval and places the ready signal in a second field of the memory, and wherein the first processor, in response to the start signal:

tests itself; and if an error is detected during the test, generates the error signal and places the error signal in the first field within the first time interval, and, if an error is not detected during the testing, reads the second field of the memory after the second time interval, the second time interval being longer than the first time interval.

6. The system according to claim 5, wherein the second processor further:

reads a third field of the memory after a third time interval;

if a first confirmation signal is stored in the third field, initializes the memory circuit and places an initialization signal in a fourth field of the memory within a fourth time interval, and, if the first confirmation signal is not stored in the third field, generates an error message;

reads a fifth field of the memory after a fifth time interval; and if a second confirmation signal is placed in the fifth field, generates an O.K. message, and, if the second confirmation signal is not placed in the fifth field, generates an error message, and wherein the first processor further:

generates the first confirmation signal within the third time interval in response to the ready signal placed in the second field of the memory and places said first confirmation signal in the third field of the memory;

reads the fourth field of the memory after a fourth time interval; and if an initialization signal is stored in the fourth field, generates a second confirmation signal and places said second confirmation signal in the fifth field of the memory within the fifth time interval, the fifth time interval being longer than the fourth time interval, which is longer than the third time interval, which is longer than the second time interval.

7. A system including:

a processor circuit comprising a first processor, a memory circuit including a memory, and a peripheral circuit coupled to the first processor: and second processor, wherein the memory circuit has a first input/output port for coupling the first processor with the memory circuit, and a second input/output port for coupling the second processor with the memory circuit, wherein the processor circuit has a first operational mode, for communication between the second processor and the memory of the memory circuit and communication among the first processor and the peripheral circuit and the memory of the memory circuit, and has a second operational mode, for communication between the second processor and the peripheral circuit without using the memory of the memory circui, wherein the second processor, in response to a start signal:

reads a first field of the memory after a first time interval; and if an error signal is stored in the first field of the memory, generates an error message, and, if an error signal is not stored in the first field of the memory, generates a ready signal within a second time interval and places said ready signal in a second field of the memory, and wherein the first processor, in response to the start signal:

tests itself; and if an error is detected during the test, generates the error signal and places the error signal in the first field within the first time interval, and, if an error is not detected during the test, reads the second field of the memory after the second time interval, the second time interval being longer than the first time interval.

8. The system according to claim 7, wherein the second processor further:

reads a third field of the memory after a third time interval;

if a first confirmation signal is stored in the third field, initializes the memory circuit and places an initialization signal in a fourth field of the memory within a fourth time interval, and, if the first confirmation signal is not stored in the third field, generates an error message;

reads a fifth field of the memory after a fifth time interval; and if a second confirmation signal is placed in the fifth field, generates an O.K. message, and, if the second confirmation signal is not placed in the fifth field, generates an error message, and wherein the first processor further:

generates the first confirmation signal within the third time interval in response to the ready signal placed in the second field of the memory and places said first confirmation signal in the third field of the memory;

reads the fourth field of the memory after a fourth time interval; and if the initialization signal is stored in the fourth field, generates a second confirmation signal and places said second confirmation signal in the fifth field of the memory within the fifth time interval, the fifth time interval being longer than the fourth time interval, which is longer than the third time interval, which is longer than the second time interval.

9. A system comprising:

a) an external processor; and b) a processor circuit, the processor circuit including:

i) a switch means, the switch means having a first input/output port coupled with the external processor, a second input/output port, and a third input/output port, the switch means having a first state in which the first input/output port is coupled, through the switch means, with the third input/output port, a second state in which the second input/output port is coupled, through the switch means, with the third input/output port, and a third state in which the first input/output port is coupled, through the switch means, with the second input output port;

ii) a memory device coupled with the third input/output port of the switch means;

iii) a first processor coupled with the second input/output port of the switch means;

iv) a peripheral circuit coupled with the first processor and the second input/output port of the switch means; and v) a control circuit coupled with the switch means for providing control signals to the switch means, the control signals selecting one of the first, second, and third states of the switch, the control circuit also being coupled with the first processor, the external processor, and the peripheral circuit.

10. The system of claim 9 wherein the system has a first mode in which the external processor communicates, via the memory, with one of the first processor and the peripheral circuit and a second mode in which the external processor communicates directly with the peripheral circuit without using the memory.

11. The system of claim 10 wherein the switch is in its third state during the second mode.

\* \* \* \* \*